United States Patent
Hiramatsu et al.

[11] Patent Number: 6,031,654
[45] Date of Patent: Feb. 29, 2000

[54] LOW MAGNET-SATURATION BISMUTH-SUBSTITUTED RARE-EARTH IRON GARNET SINGLE CRYSTAL FILM

[75] Inventors: Kiyonari Hiramatsu; Kazushi Shirai; Norio Takeda, all of Tokyo, Japan

[73] Assignee: Mitsubishi Gas Chemical Company, Inc., Tokyo, Japan

[21] Appl. No.: 09/081,941

[22] Filed: May 21, 1998

[30] Foreign Application Priority Data

Jun. 13, 1997 [JP] Japan ................................ 9-156671

[51] Int. Cl.$^7$ ........................................... G02F 1/09
[52] U.S. Cl. ........................ 359/280; 359/283; 359/324
[58] Field of Search ................................. 359/280–284, 359/324, 484

[56] References Cited

U.S. PATENT DOCUMENTS 4,770,504 9/1988 Hansen et al. ........................... 359/283
4,810,325 3/1989 Licht ........................................ 117/66

*Primary Examiner*—Benjamin Utech
*Assistant Examiner*—Donald L. Champagne
*Attorney, Agent, or Firm*—Sughrue, Mion, Zinn, Macpeak & Seas, PLLC

[57] ABSTRACT

A low magnetic saturation type bismuth-substituted rare-earth iron garnet crystal film of the invention is grown on a substrate of (111) garnet single crystal (GdCa)3(GaMgZr) 5O12 by using a liquid phase epitaxial method. This single crystal has a lattice constant of 1.2497±0.0002 nm and has a chemical structural formula expressed by $$Tb_{3-x}Bi_xFe_{5-y-z}Ga_yAl_zO_{12}$$

wherein x has the range 1.25<x<1.40, y+z has the range 0.50<y+z<0.65, and z/y has the range 0.45<z/y<0.75.

1 Claim, No Drawings

LOW MAGNET-SATURATION BISMUTH-SUBSTITUTED RARE-EARTH IRON GARNET SINGLE CRYSTAL FILM

BACKGROUND OF THE INVENTION

1. Field of the Invention

The present invention relates to a bismuth-substituted rare-earth iron garnet single crystal film suitable for a Faraday rotator used for an optical isolator. This single crystal film has a low saturation magnetization which lends itself to miniaturizing optical isolators.

2. Description of Related Art

Semiconductor lasers are widely used as a coherent signal source in the fields of optical fiber communications and optical instruments. However, semiconductor lasers are disadvantageous in that oscillation becomes unstable due to so-called reflected light return where light is reflected by, for example, the optical system back to the semiconductor laser. In order to address this drawback, an optical isolator is usually provided on the light-exiting side of the semiconductor laser. The optical isolator provides a light path which prevents the reflected light from returning to the semiconductor laser.

An optical isolator is usually constructed of two polarizers, a Faraday rotator, and a permanent magnet for causing the Faraday rotator to be magnetically saturated. Faraday rotators used for this purpose are usually bismuth-substituted rare-earth iron garnet single crystal films which exhibit large Faraday effect.

An optical isolator is built together with a semiconductor laser, in an integral construction referred to as a semiconductor laser module, and there has been a strong demand for a miniaturized optical isolator. Miniaturizing optical isolators requires a miniaturized cylindrical permanent magnet that is used for causing a Faraday rotator to be magnetically saturated. However, miniaturized cylindrical permanent magnets have weaker interior magnetic field strengths. Therefore, the Faraday rotator should have a low magnetic saturation so that the Faraday rotator can still be magnetically saturated by a weak external magnetic field.

In other words, in order that the permanent magnets can be miniaturized, a bismuth-substituted rare-earth iron garnet single crystal (referred to as BIG hereinafter) for a Faraday rotator should have as low a magnetic saturation as possible. For example, $(TbHoBi)_3Fe_5O_{12}$ is a commonly used BIG film but its magnetic saturation is as large as about 1,000 Oe which is detrimental to miniaturizing of the permanent magnet. For further miniaturization of optical isolators, the magnetic saturation of the BIG should be less than 350 Oe.

One possible way of implementing lower magnetic saturation of a BIG film is to substitute aluminum or gallium for iron. However, substituting aluminum or gallium for iron has adverse effects on the characteristics of optical isolators, such as lower Faraday rotation coefficients, increased temperature dependence of the Faraday rotation coefficients, and increases in magnetic compensation temperature (temperature at which the magnetization becomes zero).

When a BIG film thicker than 500 μm is grown on a non-magnetic garnet substrate by a liquid phase epitaxial method (LPE), the BIG film may be cracked on its periphery or the substrate can break during the growth of crystal. The manufactured BIG film must then be polished into a Faraday rotator. Thus, the BIG film must have an extra thickness of about 30μ as a polishing margin.

Therefore, Faraday rotators should have a thickness less than 470 μm and the Faraday rotation coefficient should preferably be larger than 957 degree/cm (=(45/470)×10,000). Since light having a wavelength of 1.55 μm is used in optical fiber communications, all of the physical properties described in the following description are assumed values at 1.55 μm.

Isolation is an important property that reflects the return loss of an isolator and should preferably be more than 25 dB in the temperature range from −40 to +60° C. The isolation of an optical isolator varies with temperature. This is due to the fact that a Faraday rotation angle has a temperature dependence. In order to achieve an isolation more than 25 dB, a maximum tolerable change in Faraday rotation angle is 3.2°. If a Faraday rotator has an absolute maximum tolerable change of 3.2° in the temperature range from −40 to +60° C., temperature dependence is less than 0.064 degrees/° C. (=3.2/50).

Further, at temperatures below the magnetic compensation temperature of a Faraday rotator, the Faraday rotator does not function as an optical isolator at all since the sign of the Faraday rotation coefficient changes at temperatures below the magnetic compensation temperature. Thus, the magnetic compensation temperature of a Faraday rotator must be below −40° C.

Thus, a low magnetic saturation type Faraday rotator requires a bismuth-substituted rare-earth iron garnet single crystal film having a magnetic saturation of less than 350 Oe, Faraday rotation coefficient larger than 957 degree/cm, temperature dependence of Faraday rotation angle less than 0.064 degree/° C., and magnetic compensation temperature below −40 C. No BIG has been reported which meets all of the aforementioned requirements.

SUMMARY OF THE INVENTION

An object of the invention is to provide a BIG film for fabricating a low magnetic saturation type Faraday rotator. The BIG film of the invention has a magnetic saturation less than 350 Oe, Faraday rotation coefficient larger than 957 degree/cm, temperature dependence of Faraday rotation angle less than 0.064 degree/° C., and magnetic compensation temperature below −40° C.

A low magnetic saturation type bismuth-substituted rare-earth iron garnet crystal film of the invention is grown on a substrate of (111) garnet single crystal $(GdCa)_3(GaMgZr)_5O_{12}$ by using a liquid phase epitaxial method. This single crystal has a lattice constant of 1.2497±0.0002 nm and has a chemical structural formula expressed by $$Tb_{3-x}Bi_xFe_{5-y-z}Ga_yAl_zO_{12} \qquad (1)$$

wherein x has the range 1.25<x<1.40, y+z has the range 0.50<y+z<0.65, and z/y has the range 0.45<z/y<0.75.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The inventors put significant efforts in order to solve the aforementioned problems and finally arrived at the present invention.

A low magnetic saturation type bismuth-substituted rare-earth iron garnet single crystal film of the invention is grown by a liquid phase epitaxial method on a substrate of (111) garnet single crystal $(GdCa)_3(GaMgZr)_5O_{12}$ having a lattice constant of 1.2497±0.0002 nm, and has a chemical structural formula expressed by

$$Tb_{3-x}Bi_xFe_{5-y-z}Ga_yAl_zO_{12} \tag{1}$$

wherein x has the range 1.25<x<1.40, y+z has the range 0.50<y+z<0.65, and z/y has the range 0.45<z/y<0.75.

If the amount x of bismuth substitution of a BIG film having the formula of Equation (1) becomes less than 1.25, the Faraday effect decreases and the required thickness increases correspondingly (Faraday rotation effect is proportional to the amount of bismuth substitution). Conversely, if the amount x exceeds 1.40, the lattice constant of the BIG is not matched with that of the non-magnetic garnet substrate. Thus, it is difficult to obtain a good single crystal.

If the substitution amount y+z of gallium and aluminum exceeds 0.50, the saturation magnetization exceeds 350 Oe. This is detrimental. On the other hand, y+z in excess of 0.65 causes problems such as the temperature dependence of Faraday rotation angle exceeding 0.064 degree/° C. and the magnetization compensation temperature higher than −40° C.

If the proportion z/y of aluminum (z) to gallium (y) is less than 0.45, the substitution amount of bismuth decreases and correspondingly the thickness of a Faraday rotator required for the same Faraday rotation increases. On the other hand, z/y exceeding 0.75 causes the saturation magnetization to exceed 350 Oe. This is detrimental.

A garnet substrate on which a BIG film of the invention is grown is preferably a substrate of (111) garnet single crystal $[(GdCa)_3(GaMgZr)_5O_{12}]$ having a lattice constant of 1.2497±0.0002 nm. This substrate is currently widely used for growing a bismuth-substituted rare-earth iron garnet single crystal film for a Faraday rotator.

The present invention will be described in detail by way of examples and comparisons.

EXAMPLE 1

The following materials were placed in a platinum crucible of 2,000 ml capacity: 4,500 gm lead oxide (PbO, 4N), 5,230 gm bismuth oxide ($Bi_2O_3$, 4N), 666 gm ferric oxide ($Fe_2O_3$, 4N), 230 gm boron oxide ($B_2O_3$, 5N), 68.0 gm terbium oxide ($Tb_2O_3$, 3N), 42.0 gm gallium oxide ($Ga_2O_3$, 3N), and 13.0 gm aluminum oxide ($Al_2O_3$, 3N). The materials were then heated into a melt for growing a bismuth-substituted rare-earth iron garnet single crystal.

A single crystal film was epitaxially grown in a known manner with one side of a substrate of (111) garnet single crystal $[(GdCa)_3(GaMgZr)_5O_{12}]$ in contact with the surface of the melt. The substrate has a thickness of 500 μm and a lattice constant of 1.2497±0.0002 nm. Obtained was a $Tb_{1.69}Bi_{1.31}Fe_{4.38}Ga_{0.42}Al_{0.20}O_{12}$ single crystal film (referred to as G-film-1 herein after) having a thickness of 497 μm. The composition of the single crystal film was analyzed by the inductively coupled plasma spectrometry (ICP emission spectrometry). The G-film-1 is polished to a thickness of 456 μm. The substrate was removed during the polishing operation. Then, an antireflection film for 1.55 μm was formed on both sides of the G-film-1, thereby fabricating a Faraday rotator (referred to as Faraday-rotator-1 hereinafter) for use with light having a wavelength of 1.55 μm. The magneto-optical properties of Faraday rotator-1 were examined as follows:

The magnetic properties were measured by the following method. First, Faraday-rotator-1 was placed at the center of a magnetic field generator having a Helmholtz coil, commercially available from MAGNETICS. Faraday-rotator-1 was exposed to a semiconductor laser having a wavelength of 1,550 nm while being in an environment of a magnetic field. The saturation magnetic field was determined by measuring the rotation angle of the polarization plane of the laser transmitted through Faraday-rotator-1. Further, the saturation magnetic field and Faraday rotation angle were measured at various ambient temperatures.

The Faraday rotation of Faraday-rotator-1 was 45.3 degrees at 25° C. (the Faraday rotation coefficient was 993 degree/cm). The saturation magnetic field was 295 Oe at 25° C. and reached a maximum of 340 Oe in the temperature range from −40 to +60° C. The temperature dependence of Faraday rotation was 0.062 degree/° C. and the magnetic compensation temperature was equal to or less than −40° C.

EXAMPLE 2

The following materials were placed in a platinum crucible of 2,000 ml capacity: 4,500 gm lead oxide (PbO, 4N), 5,230 gm bismuth oxide ($Bi_2O_3$, 4N), 666 gm ferric oxide ($Fe_2O_3$, 4N), 230 gm boron oxide ($B_2O_3$, 5N), 57.0 gm terbium oxide ($Tb_2O_3$, 3N), 37.0 gm gallium oxide ($Ga_2O_3$, 3N), and 16.5 gm aluminum oxide ($Al_2O_3$, 3N). The materials were then heated into a melt for growing a bismuth-substituted rare-earth iron garnet single crystal.

A single crystal film was epitaxially grown in a known manner with one side of a substrate of (111) garnet single crystal $[(GdCa)_3(GaMgZr)_5O_{12}]$ in contact with the surface of the melt. The substrate has a thickness of 500 μm and a lattice constant of 1.2497±0.0002 nm. Obtained was a $Tb_{1.68}Bi_{1.32}Fe_{4.42}Ga_{0.34}Al_{0.24}O_{12}$ single crystal film (referred to as G-film-2 herein after) having a thickness of 500 μm.

G-film-2 was polished to a thickness of 448μ and the substrate was removed during the polishing operation. Then, an antireflection film for 1.55 μm was formed on both sides of the G-film-2, thereby fabricating a Faraday rotator (referred to as Faraday-rotator-2 hereinafter) for use with light having a wavelength of 1.55 μm. The magneto-optical properties of Faraday-rotator-2 were examined in exactly the same way as in Example 1.

The Faraday rotation of Faraday-rotator-2 was 44.9 degrees at 25° C. (the Faraday rotation coefficient was 1,002 degree/cm). The saturation magnetic field was 305 Oe at 25° C. and reached a maximum of 340 Oe in the temperature range from −40 to +60 C. The temperature dependence of Faraday rotation angle was 0.061 degree/° C. and the magnetic compensation temperature was equal to or less than −40° C.

COMPARISON 1

The following materials were placed in a platinum crucible of 2,000 ml capacity: 4,500 gm lead oxide (PbO, 4N), 5,230 gm bismuth oxide ($Bi_2O_3$, 4N), 666 gm ferric oxide ($Fe_2O_3$, 4N), 230 gm boron oxide ($B_2O_3$, 5N), 68.0 gm terbium oxide ($Tb_2O_3$, 3N), 72.0 gm gallium oxide ($Ga_2O_3$, 3N), and 11.0 gm aluminum oxide ($Al_2O_3$, 3N). The materials were then heated into a melt for growing a bismuth-substituted rare-earth iron garnet single crystal.

Using the melt, a single crystal film was epitaxially grown in a manner similar to the Example 1. Obtained was a $Tb_{1.71}Bi_{1.29}Fe_{4.15}Ga_{0.70}Al_{0.15}O_{12}$ single crystal film (referred to as G-film-C1 herein after) having a thickness of 498 μm.

From this G-film-C1, a Faraday rotator (Faraday rotator-C1) was fabricated in a similar way to Example 1. Faraday rotator-C1 has a thickness of 462 μm and is for use with light having a wavelength of 1.55 μm. The magneto-optical properties were measured in exactly the same way as in Example 1. The saturation magnetic field was 220 Oe at 25° C. and reached a maximum of 264 Oe in the temperature range from −40 to +60° C. The magnetic compensation temperature was −36° C.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A low magnetic saturation type bismuth-substituted rare-earth iron garnet crystal film grown by a liquid phase epitaxial method on a substrate of (111) garnet single crystal $(GdCa)_3(GaMgZr)_5O_{12}$ having a lattice constant of 1.2497±0.0002 nm, said single crystal film having a chemical structural formula expressed by $$Tb_{3-x}Bi_xFe_{5-y-z}Ga_yAl_zO_{12}$$

wherein x has the range 1.25<x<1.40, y+z has the range 0.50<y+z<0.65, and z/y has the range 0.45<z/y<0.75.

* * * * *